F. W. ERICKSON.
COUPLING FOR PIPES OR CONDUITS.
APPLICATION FILED NOV. 22, 1910.
1,041,260.
Patented Oct. 15, 1912.
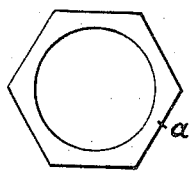
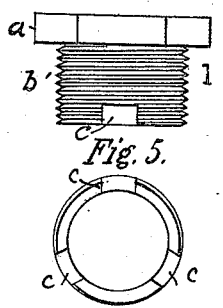
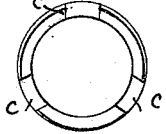
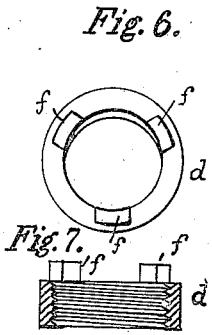
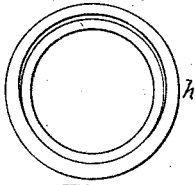
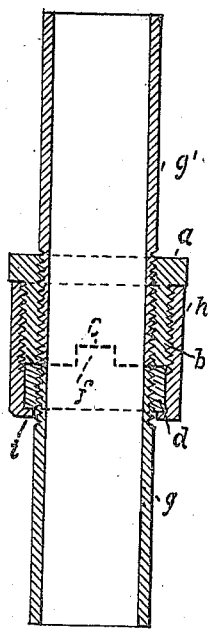
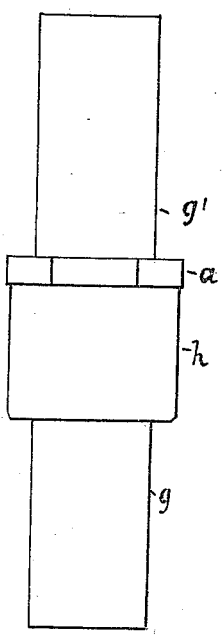
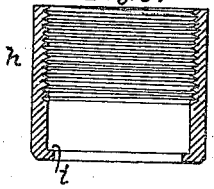
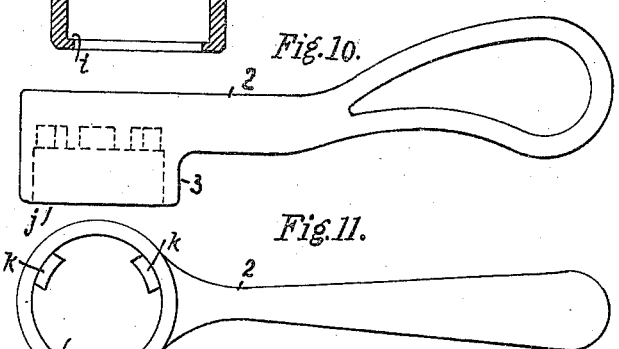
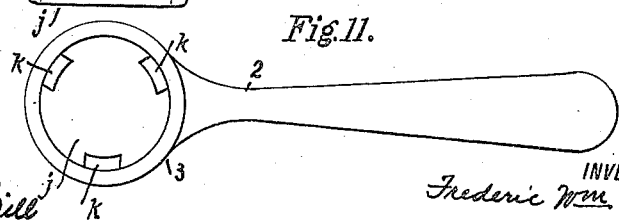
WITNESSES:
D. A. Hill
John Martin
INVENTOR
Frederic Wm. Erickson
BY
Geo. Willis Pierce
ATTORNEY

# UNITED STATES PATENT OFFICE.

FREDERIC WM. ERICKSON, OF NEW YORK, N. Y., ASSIGNOR TO LORD MANUFACTURING COMPANY, OF NEW YORK, N. Y.

COUPLING FOR PIPES OR CONDUITS.

1,041,260.  Specification of Letters Patent.  Patented Oct. 15, 1912.

Application filed November 22, 1910. Serial No. 593,611.

*To all whom it may concern:*

Be it known that I, FREDERIC WM. ERICKSON, residing at New York, in the county of New York and State of New York, have invented certain Improvements in Couplings for Pipes or Conduits, of which the following is a specification.

The present invention relates to what are termed universal couplings to join together the ends of pipes or conduits used in building to carry electrical conductors in which it is requisite that moisture shall be excluded and the inner surfaces at such joints shall be smooth so that the insulation of the conductors shall not be injured.

In carrying out the invention I provide separate parts to be attached to the contiguous ends of the pipes to be joined, each part being provided with interlocking means so that one part will not turn relatively to the other, and secure them together by a third part or sleeve, thus securing the three parts to each other and to the pipes and firmly butting the ends of the pipes to one another. All of which I will now proceed to describe and point out in the appended claim.

In the drawings forming a part and illustrating this specification—Figure 1 is an elevation of a complete joint. Fig. 2 is a horizontal section of Fig. 1. Figs. 3, 4 and 5 are respectively top side and bottom views of one of the parts of the joint. Figs. 6 and 7 are respectively top and sectional side views of another portion. Figs. 8 and 9 are respectively top, and side sectional views of the sleeve portion. And Figs. 10 and 11 are side and bottom views of a wrench used in making a joint with the several parts.

In the drawings $g$ and $g'$ are sections of pipes to be joined, the opposite ends of which are squared and screw threads cut on their outer surfaces. The part $d$ is screwed onto the end of pipe $g$ so that its outer end is flush with the end of the pipe, and the part 1 is screwed upon the end of the pipe $g'$ so that its outer end is even with the end of the pipe. The part $d$ is shown as having three projections $f\ f\ f$ from its outer end, while the part 1 has three depressions $c\ c\ c$ in its outer end so that when the pipes are brought together the projections $f\ f\ f$ fit into the depressions $c\ c\ c$. The outer surface, as well as the inner surface, of the part 1 is screw-threaded and adapted to engage the internally screw-threaded sleeve $h$. The sleeve $h$ is internally screw-threaded for about one-half its length and when in place as indicated in Fig. 2 its smooth interior covers the outside of the part $d$ and at its lower end is provided with a lip $i$ extending about the same to engage the under side of the part $d$ and hold it and the pipe $g$ upward to the pipe $g'$.

In preparing to make the joint the part 1 is screwed onto the pipe $g'$ by means of a wrench embracing its hexagonal end $a$ which extends over and forms a protection or a cover for the end of the sleeve $h$; and the part $d$ is screwed onto the end of the pipe $g$ by means of the wrench shown in Figs. 10 and 11, one end of which is hollowed out to receive the part $d$ and provided with depressions $k\ k\ k$ to engage the projections $f\ f\ f$ on the end of $d$. I find in practice if a common wrench is used to screw the part $d$ onto a pipe it roughens its outer surface so that it is difficult for the sleeve $h$ to pass over it.

The sleeve $h$ is preferably of light construction in order to keep down the outside diameter and have the joint as compact as possible, and if the outer surface of part $d$ is rough there will be greater friction between it and the sleeve $h$.

The locking of the parts 1 and $d$ renders it impossible for the part $d$ to turn by reason of any friction between it and the sleeve $h$ when the latter is screwed on.

I claim as my invention:—

A pipe coupling adapted to externally connect two pipe sections with the ends of the latter abutting, said coupling comprising two pipe-engaging members and an inclosing sleeve, said pipe-engaging members having interengaging and directly abutting projections and recesses, one of said members being internally threaded and externally smooth and the other one being both internally and externally threaded and having an enlargement at one end to be operatively engaged by a wrench, the said sleeve having an internally threaded portion to coact with the external thread of the member having the enlargement and having an internally smooth portion and an inwardly projecting lip to surround and engage the end of the externally smooth member, the length of the sleeve relatively to the two pipe-engaging members being such that when the enlargement of one of said members is engaged by one end of the sleeve the lip at the other end of the sleeve holds the two pipe-engaging members in endwise contact with their projections and recesses interlocked.

In testimony whereof, I have signed my name to this specification in the presence of two subscribing witnesses, this 16th day of November 1910.

FREDERIC WM. ERICKSON.

Witnesses:
HARRIET LEVI,
JOHN A. COLE.

Copies of this patent may be obtained for five cents each, by addressing the "Commissioner of Patents, Washington, D. C."